March 14, 1967   E. A. GLASSEY   3,308,991
BLENDER FOR SLURRIES AND MIXTURES
Filed June 14, 1965   2 Sheets-Sheet 2
FIG_2
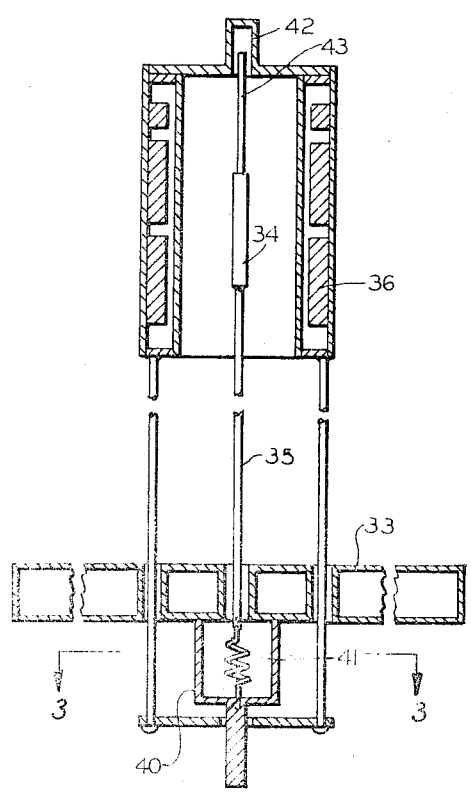
FIG_3
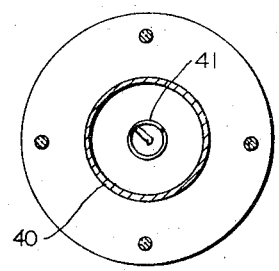
FIG_4
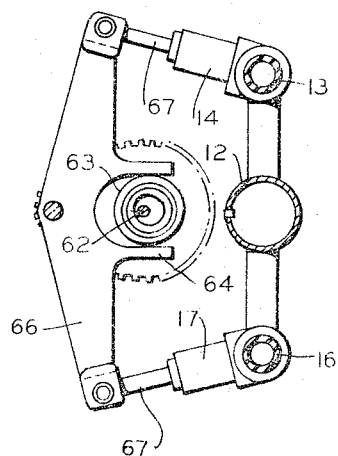
INVENTOR.
EUGENE A. GLASSEY
BY
Julian Caplan
ATTORNEY

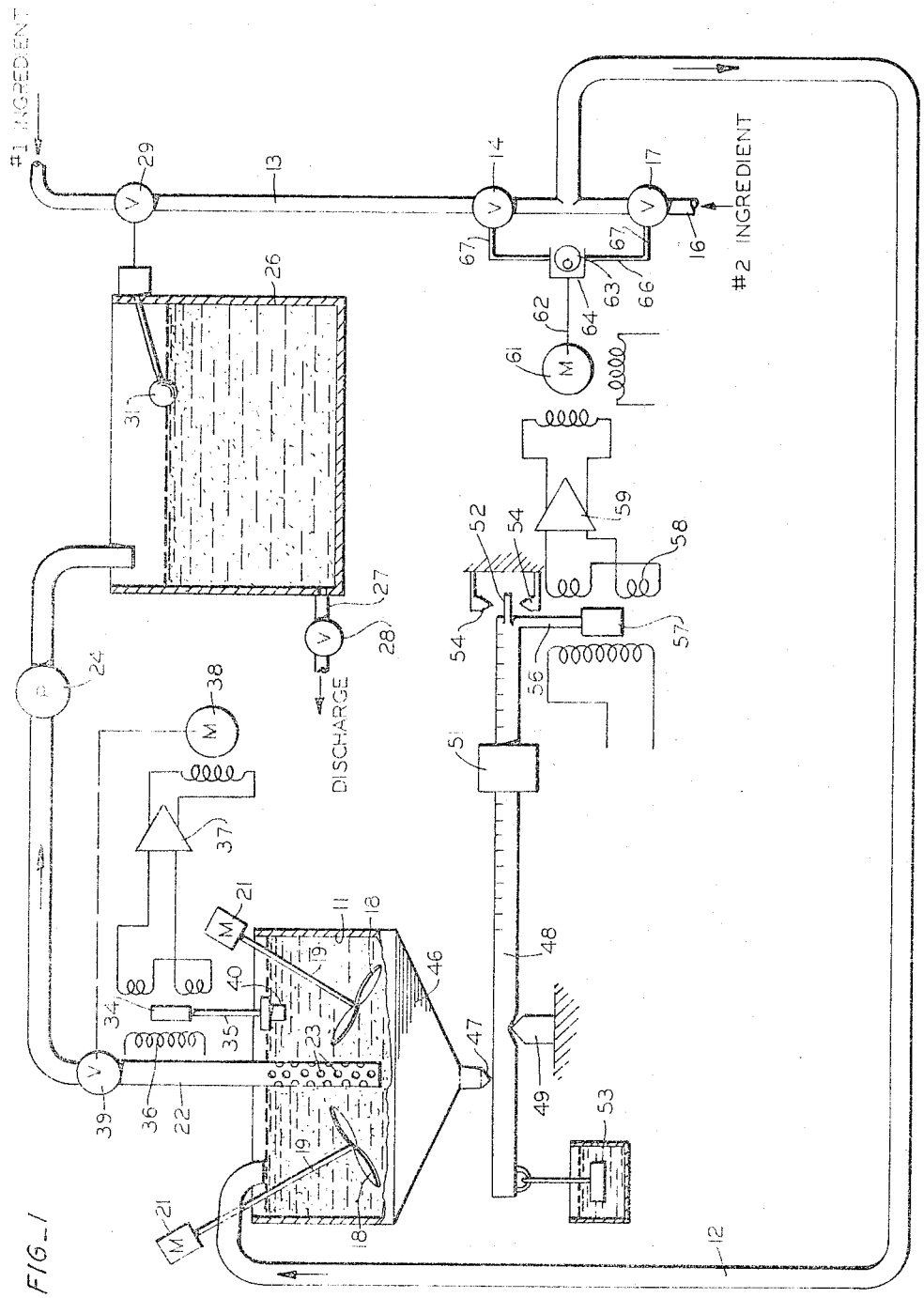

United States Patent Office 3,308,991
Patented Mar. 14, 1967

3,308,991
BLENDER FOR SLURRIES AND MIXTURES
Eugene A. Glassey, Los Altos, Calif., assignor to Exactel Instrument Company, Mountain View, Calif.
Filed June 14, 1965, Ser. No. 463,655
6 Claims. (Cl. 222—57)

This invention relates to a new and improved blender which controls the density of slurries and mixtures. More particularly, the present invention comprises a blending tank into which two ingredients of different density are delivered and mixed together and from which, from time to time as required, the mixed ingredients are withdrawn. By varying the input of the two ingredients, the density of the mixture is controlled. The present invention provides means for maintaining the volume of mixture within the tank at a constant level, weighing the constant volume and varying the setting of valves controlling the intake of the two ingredients dependent upon the weight of the tank and contents.

Accordingly, the present invention provides an extremely accurate control for maintaining the density of ingredients such as slurries and mixtures at a set level by automatically varying the rate of intake of each of the two ingredients dependent upon variations in the weight of a fixed volume of mixed ingredients.

A further feature of the invention is the provision of means for adjusting the electrical controls hereinafter described in detail dependent upon the temperature of the mixture, which temperature affects the weight of the given volume.

As further set forth in detail, a differential transformer is energized by an armature connected to the weighing apparatus which differential transformer controls a servomotor which actuates the valves.

Other objects of the present invention will become apparent upon reading the following specification and referring to the accompanying drawings in which similar characters of reference represent corresponding parts in each of the several views.

In the drawings:

FIG. 1 is a schematic side elevation of the blender and associated structure and electrical components.

FIG. 2 is a vertical sectional view of the float control of the blender tank.

FIG. 3 is a sectional view taken substantially along the line 3—3 of FIG. 2.

FIG. 4 is a horizontal sectional view through the intake conduit valves and associated structure.

In accordance with the present invention there is provided a tank 11 which is supplied with a mixture of ingredients through a conduit 12. Conduit 12 is supplied with a first ingredient (e.g. water) through a pipe 13 controlled by a variable opening valve 14 such as a diaphragm valve. A second ingredient is supplied through conduit 16 and controlled by a second variable valve 17. By adjusting the relative openings of the valves 14 and 17 by means hereinafter set forth in detail, the density of the mixture of the two ingredients as received in tank 11 is adjusted.

Means is provided to stir the contents of tank 11 and such means is schematically illustrated by stirrers 18, shafts 19, and motors 21 driving said shafts. A pipe 22 which is preferably formed with perforations 23 throughout its length so as to obtain a representative sampling of the ingredients of tank 11 extends into the tank and the mixed ingredients are drawn off through pipe 22 preferably by means of pump 24 and discharged into a holding tank 26. From time to time the mixture or slurry is withdrawn from holding tank 26 through outlet pipe 27 as controlled by a valve 28 or similar means. In many instances, the withdrawal of the mixture through outlet 27 is intermittent and accordingly tank 26 may be provided with a float valve 29 installed in pipe 13 and having a float 31 which floats on the surface of the liquid within tank 26 to maintain the amount of mixture held in the tank 26 roughly constant.

For the purpose of this invention it is important the volume of slurry or mixture within tank 11 be very accurately constant and for such purpose a float 33 rests on the surface of the contents of tank 11. Such a float supports an armature 34 located on the upper end of stem 35 within a differential transformer 36. The output of transformer 36 is amplified by amplifier 37 to energize a servo-motor 38 which controls valve 39 in conduit 22. Since the density of the contents of tank 11 is dependent upon temperature, a temperature compensator may be provided. Float 33 has a downward extension 40 immersed in the tank and sensitive to temperature. Bimetallic oil 41 is located in extension 40 and is fixed at its lower end to the bottom of extension 40 and at its upper end to stem 35. Guide 42 on the upper end of transformer 36 receives pin 43 on the upper end of armature 34. Accordingly, the volume of contents of tank 11 is accurately controlled but is also adjusted dependent upon temperature variations.

Tank 11 is mounted on top of a platform 46 similar to the platform of a scale and said platform has a knife edge 47 which engages a beam 48 which is fulcrummed by means of fulcrum 49. On the side of fulcrum 49 opposite edge 47 is a poise 51 which is movable longitudinally of beam 48 and by moving the poise the control valves governing density may be adjusted. Further to control the movement of beam 48, limit stops 54 may be installed to engage extension 52 at the upper and lower extremities of its travel. Movement of beam 48 may be dampened by means of oil filled dashpot 53.

Connected by means of arm 56 to beam 48 is an armature 57 which is normally electrically centered in differential transformer 58. The output of transformer 58 is amplified by amplifier 59 to control the servo-motor 61. Mounted on the output shaft 62 of motor 61 is an eccentric 63 located within the yoke 64 supported by arms 66 which are attached to the stem 67 of valves 14 and 17 respectively. As shaft 62 turns, eccentric 63 changes the position of arms 66 to open one of the valves 14, 17, and close the other of said valves proportionately.

It will be seen that setting of the poise 51 on beam 58 controls the relative openings of valves 14 and 17 so that for a given volume of material in tank 11 (as adjusted for temperature) the density will be predetermined. From time to time as the demand on output line 27 requires, valve 29 is open to admit the first ingredient through inlet 13 and thereupon the valves 14, 17, are adjusted so that the relative proportion of the two ingredients results in the required density within tank 11. The volume within the tank 11 is adjusted by valve 39 dependent upon the position of float 33 with temperature compensation accomplished through bimetallic link 41.

What is claimed is:

1. In a device for controlling density of a mixture of two ingredients, a tank, a first conduit for a first ingredient having a first valve, a second conduit for a second ingredient having a second valve, said first and second conduits discharging into said tank, said conduits mechanically separated from said tank and said tank movable independently of said conduits, first means for withdrawing mixed ingredients from said tank, a balance, second means for applying the weight of said tank and its contents to said balance, a counterweight on said balance, an armature, movable with said balance, a differential transformer excited by movement of said armature, a servo-motor controlled by said differential transformer, and third means actuated by said servomotor for adjusting the relative openings of said valves to maintain the delivery of said ingredients to said tank such that the weight of a fixed quantity of mixed ingredients equals a selected value.

2. A device according to claim 1 in which said first means comprises a third valve, a float on the surface of the contents of said tank, and fourth means responsive to the position of said float to adjust the opening of said third valve to maintain the level of contents in said tank substantially constant.

3. A device according to claim 2 which further comprises temperature sensitive means connected to said float to compensate for temperature variations to vary the level of contents of said tank.

4. A device according to claim 2 in which said fourth means comprises a second armature movable with said float, a second differential transformer excited by said second armature, a second servo-motor controlled by said second transformer and connected to said third valve.

5. A device according to claim 4 which further comprises a bimetallic link responsive to temperature within said tank between said float and said second armature to compensate the position of said second armature for temperature variations to vary the level of contents of said tank.

6. A device according to claim 1 which further comprises a holding tank receiving the discharge of said first means, and means responsive to the level of mixed ingredients in said holding tank to vary the admission of at least one said ingredient through one said conduit.

References Cited by the Examiner
UNITED STATES PATENTS

| | | | |
|---|---|---|---|
| 1,178,194 | 4/1916 | Trimbey | 73—434 |
| 2,609,965 | 9/1952 | Kast | 222—55 |
| 2,917,207 | 12/1959 | Prowse et al. | 222—55 |
| 3,151,775 | 10/1964 | Whitehead | 222—57 |

ROBERT B. REEVES, *Primary Examiner.*

HADD S. LANE, *Examiner.*